United States Patent
Chen et al.

(10) Patent No.: US 8,601,411 B2
(45) Date of Patent: Dec. 3, 2013

(54) PRE-COLORED METHODOLOGY OF MULTIPLE PATTERNING

(75) Inventors: Yen-Huei Chen, Jhudong Township (TW); Wei Min Chan, Sindian (TW); Hung-Jen Liao, Hsinchu (TW); Jonathan Tsung-Yung Chang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/586,177

(22) Filed: Aug. 15, 2012

(65) Prior Publication Data

US 2013/0263065 A1 Oct. 3, 2013

Related U.S. Application Data

(60) Provisional application No. 61/617,113, filed on Mar. 29, 2012.

(51) Int. Cl.
*G06F 17/50* (2006.01)

(52) U.S. Cl.
USPC .............................................. 716/55; 716/50

(58) Field of Classification Search
USPC ..................................................... 716/50–55
See application file for complete search history.

(56) References Cited

U.S. PATENT DOCUMENTS

| | | | |
|---|---|---|---|
| 6,785,879 B2 * | 8/2004 | Pierrat | 716/53 |
| 2009/0037866 A1 * | 2/2009 | Graur et al. | 716/19 |

* cited by examiner

*Primary Examiner* — Binh Tat
(74) *Attorney, Agent, or Firm* — Eschweiler & Associates, LLC

(57) ABSTRACT

Some embodiments relate to a method for pre-coloring data within an integrated chip layout to avoid overlay errors that result from mask misalignment during multiple patterning lithography. The method may be performed by generating a graphical IC layout file containing an integrated chip layout having a plurality of IC shapes. The IC shapes within the graphical IC layout file are assigned a color during decomposition. The IC shapes are further pre-colored in a manner that deliberately assigns the pre-colored data to a same mask. During mask building data associated with IC shapes that have been pre-colored is automatically sent to a same mask, regardless of the colors that are assigned to the shapes. Therefore, the pre-colored shapes are not assigned to a masked based upon a decomposition, but rather based upon the pre-coloring. By assigning IC shapes to a same mask through pre-coloring, overlay errors can be reduced.

20 Claims, 8 Drawing Sheets

PRE-COLORED METHODOLOGY OF MULTIPLE PATTERNING

BACKGROUND

Over the last four decades the semiconductor industry has improved the performance and power consumption of integrated chips (ICs) by reducing the size of components within the ICs. For example, by reducing the size of transistors within an IC, semiconductor manufacturers are able to build ICs having more transistors that operate at faster speeds and lower power.

In large part, the ability to shrink the size of components within an IC is driven by lithographic resolution. In recent years however, tool vendors have been unable to adequately decrease the wavelength of illumination sources, so that developing technology nodes have minimum feature sizes of 20% or less than the wavelength of illumination used in lithographic tools.

Multi patterning lithography (MPL) is one lithography strategy that is used in emerging technology nodes to overcome limitations in lithographic resolution. During MPL data prep, an original layout is decomposed into two or more colors (e.g., black and gray), such that features of a same color are formed on a same mask of a multiple patterning lithography exposure (e.g., a double patterning, triple patterning, etc.). By splitting IC layout data into multiple masks, printing below a printable threshold is enabled since the data on each of the separate masks does not violate the printable threshold.

DETAILED DESCRIPTION

Figure 1:
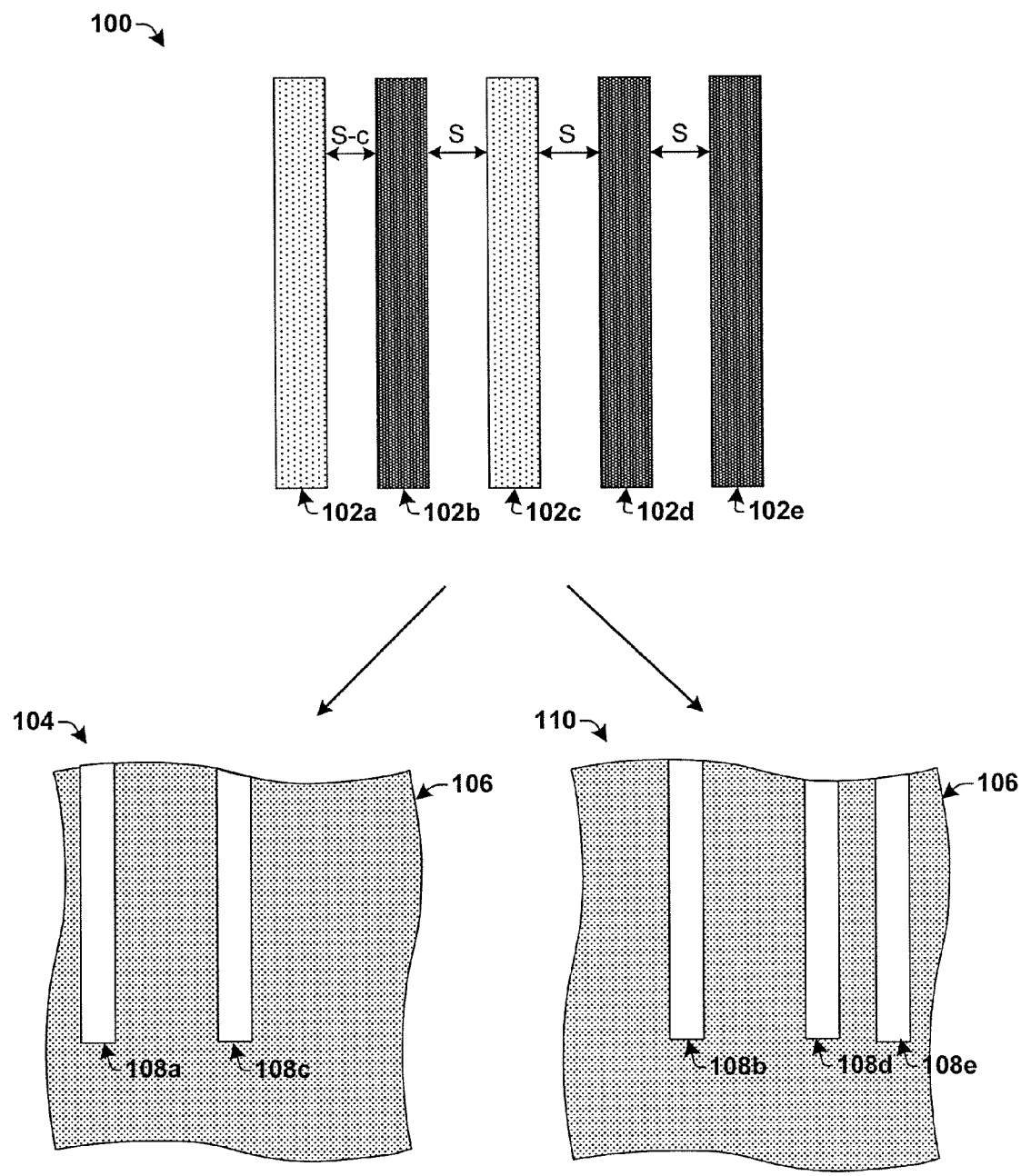
FIG. 1 illustrates block diagrams showing an exemplary decomposition of an IC layout for a double patterning lithography process.

The present disclosure will now be described with reference to the drawings wherein like reference numerals are used to refer to like elements throughout, and wherein the illustrated structures are not necessarily drawn to scale. It will be appreciated that this detailed description and the corresponding figures do not limit the scope of the present disclosure in any way, and that the detailed description and figures merely provide a few examples to illustrate some ways in which the inventive concepts can manifest themselves.

Double patterning lithography forms a single integrated chip layer, having on-wafer shapes separated by a space that is below a printable threshold, by breaking an IC layout's data onto two separate photomasks that each comprise shapes spaced above the printable threshold. To perform double patterning lithography (DPL) shapes within an integrated circuit (IC) layout are decomposed according to an algorithm that assigns different colors (corresponding to different mask exposures) to adjacent shapes separated by a space less than the printable threshold and that randomly assigns colors to adjacent shapes having a spacing greater than or equal to the printable threshold. Shapes assigned a same color are then written to a same mask.

For example, FIG. 1 illustrates block diagrams showing an exemplary decomposition of data within an IC layout 100 for a double patterning lithography. The IC layout 100 comprises a plurality of metal wire segments 102a-102e on a same metal wire layer (e.g., a first metal interconnect layer). Metal wire segments 102a-102b are separated by a space S-c, which is less than the printable threshold (i.e., which cannot be formed on a single mask). Metal wire segments 102b-102e are separated by a space S, which is equal to the printable threshold (i.e., which can be formed on a single mask).

Metal wire segments 102a-102e are decomposed in a manner that forms a first mask 104 and a second mask 110, respectively having an opaque surface 106 (e.g., a chrome surface) with openings 108a-108e corresponding to metal wire segments 102a-102e. Since adjacent metal wire segments 102a-102b are separated by a space S-c that is less than the printable threshold S, they are decomposed to different masks. For example, segment 102a is assigned a color associated with first mask 104 and segment 102b is assigned a color associated with second mask 110. Since metal wire segments 102b-102e are not separated by a space less than the printable threshold, they are randomly decomposed. For example, segment 102c is assigned a color associated with first mask 104, segment 102d is assigned a color associated with second mask 110, and segment 102e is assigned a color associated with second mask 110.

Figure 2:
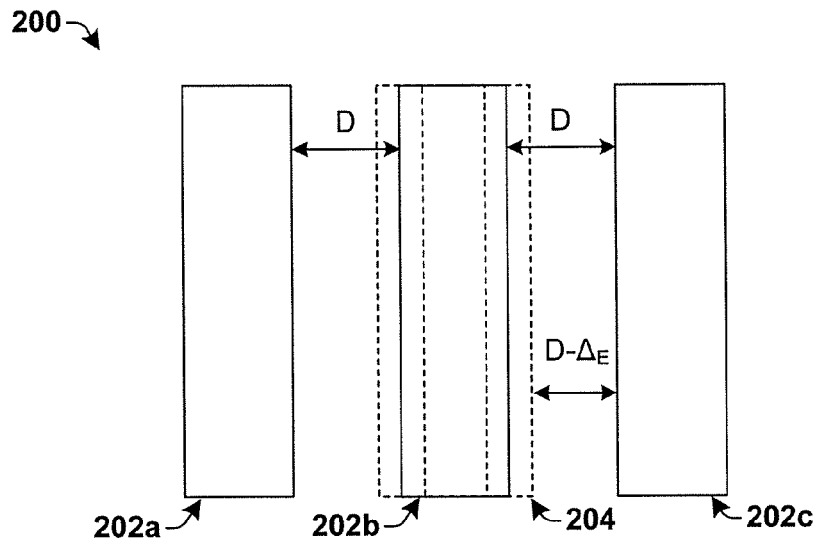
FIG. 2 is a block diagram showing an overlay error on metal wire segments formed using a double patterning lithography.

A multiple patterning lithography process allows for a lithographic exposure tool to reduce the minimum feature size that it can print. However, the use of multiple masks introduces processing variations (e.g., mask misalignment, CD variation) to on-chip structures. For example, FIG. 2 is a block diagram of an IC layout 200 showing an overlay error due to mask misalignment in a double patterning lithography process. The IC layout 200 comprises a first metal line segment 202a, a second metal line segment 202b, and a third metal line segment 202c, separated from one another by a spacing D. If the second metal line segment 202b is formed using a different mask than the first metal line segment 202a and/or third metal line segment 202c, a misalignment between the masks (e.g., misalignment of a second mask relative to a first mask) can result in an overlay error $\Delta_E$ that decreases the on-chip spacing between the second metal line segment 202b and the first or third metal line segments, 202a or 202c, to D-$\Delta_E$.

While such processing variations had a minimal effect on performance in larger technology nodes (e.g., 45 nm), it has been appreciated that as the size of integrated chip components shrink (e.g., in emerging technology nodes such as 22 nm, 16 nm, etc.), such processing variations are increasingly detrimental to operation in some areas of an integrated chip. For example, in static random access memory (SRAM) circuits, where differential sensing is widely adopted for read operations, the symmetry of a differential data lines and paired devices within a sense amplifier is important to proper operation of the SRAM circuit. Processing variations caused by multiple patterning lithography can lead to asymmetries in the data lines and/or paired devices that result in errors in operation of the SRAM circuits.

Accordingly, the present disclosure relates to a method and apparatus for pre-coloring data within an integrated chip layout to avoid processing variations (e.g., overlay errors) that result from multiple patterning lithography processes. In some embodiments, the method comprises generating a graphical IC layout file comprising an integrated chip layout having a plurality of IC shapes. One or more of the plurality of IC shapes are pre-colored in a manner that denotes shapes that are to be written to a same mask. A decomposition algorithm is also operated upon the graphical IC layout file to assign colors to uncolored IC shapes within the IC layout. During mask building, data associated with IC shapes that have been pre-colored is written to a same mask. Therefore, the pre-colored shapes are not assigned to a mask based upon decomposition algorithm, but are instead assigned to a mask based upon the pre-coloring. By assigning IC shapes to a same mask through pre-coloring, processing variations (e.g., overlay errors) between selected IC shapes can be reduced.

Figure 3:
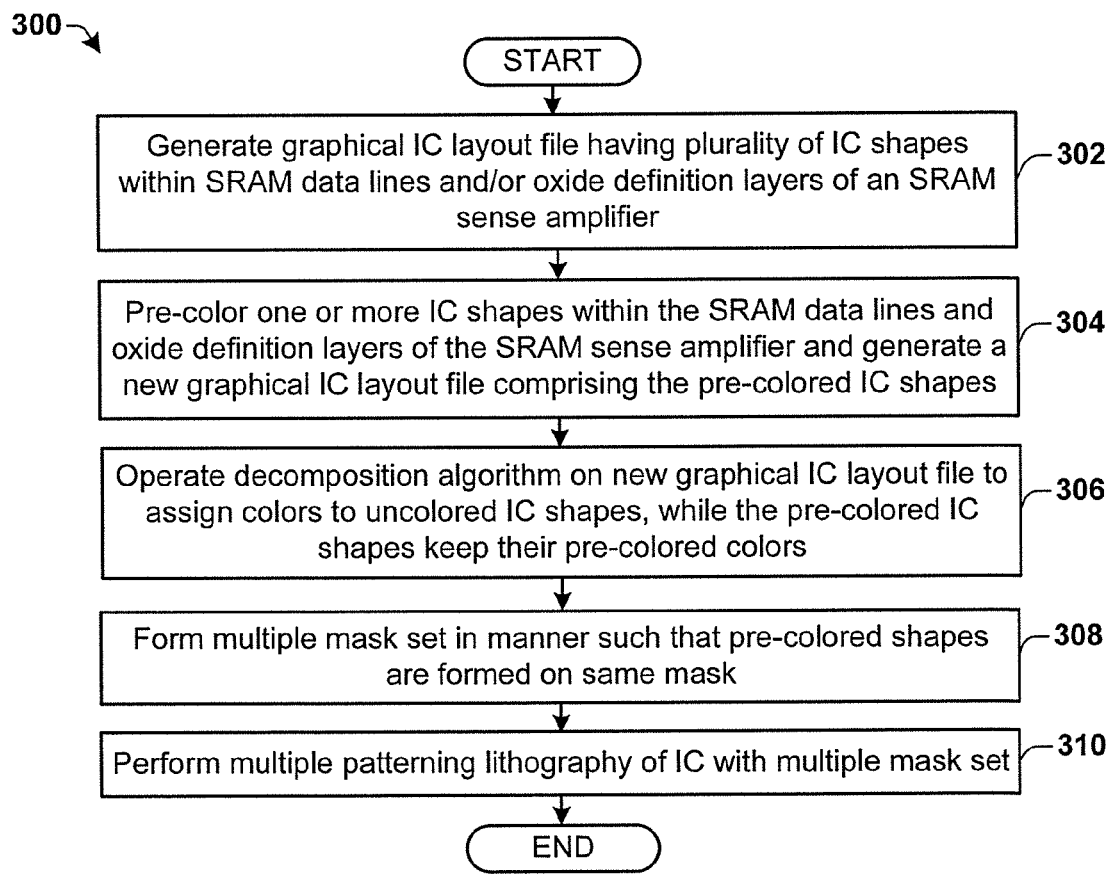
FIG. 3 is a flow diagram illustrating some embodiments of a method of pre-coloring data in a multiple patterning lithography process.

FIG. 3 is a flow diagram illustrating some embodiments of a method 300 of pre-coloring data corresponding to one or more IC shapes for a multiple patterning lithographic exposure process (e.g., a double patterning exposure process, a triple patterning exposure process, etc.).

At step 302, a graphical IC layout file is generated having a plurality of IC shapes comprised within data lines and/or oxide definition layer shapes of a static random access memory (SRAM) cell. The graphical IC layout file contains a graphical representation of an integrated chip. In some embodiments, the graphical IC layout comprises a Graphic Database System (GDS) file, such as a GDS or GDSII file. In other embodiments, the graphical layout may comprise a CIF or OASIS file format, for example.

At step 304, one or more of the plurality of IC shapes within the data lines and oxide definition layer of a sense amplifier are pre-colored and a new graphical IC layout file comprising the pre-colored IC shapes is generated. Pre-colored IC shapes are assigned to a specific mask of a multiple mask set for a multiple patterning lithography process. In other words, pre-coloring the IC shapes is a means of identifying IC shapes that are to be written to a specific mask during mask building independent of decomposition.

It will be appreciated that in various embodiments, the one or more IC shapes may be pre-colored in various manners. In some embodiments, pre-coloring is performed by placing a pre-coloring marker shape on one or more of the plurality of IC shapes to indicate that the marked IC shapes are to be formed on a particular mask of a multiple mask set. The pre-coloring marker shape may be placed over a colored or uncolored IC shapes during design (i.e., by a designer) to indicate that the shape has been pre-colored, for example. In such embodiments, IC shapes assigned a pre-colored marker shapes are written to a particular mask in spite of colors assigned during decomposition. In other embodiments, pre-coloring is performed by assigning a pre-coloring color not used in decomposition to the one or more of the IC shapes. In such an embodiment, the total number of colors is greater than the number of masks, such that data assigned the pre-coloring color and another color are to be formed on a particular mask of the multiple mask set. In yet other embodiments, pre-coloring is performed by assigning a color used in decomposition to one or more of the IC shapes prior to decomposition.

In some embodiments, the pre-coloring of data is governed by integrated chip design rules that prevent the formation of unprintable masks. For example, in some embodiments design rules may limit placement of pre-coloring marker shapes to prevent placement of pre-coloring marker shapes on adjacent IC shapes separated by a space that is less than a design rule value.

At step 306, a decomposition algorithm is operated on the new graphical IC layout file. The decomposition algorithm assigns different colors to uncolored IC shapes, while the prec-olored IC shapes within the data lines and/or oxide definition layers keep their pre-colored color. The decomposition algorithm thereby separates data within the new graphical IC layout file into multiple groups, with each group assigned a different color. In some embodiments, the decomposition algorithm assigns two or more colors to uncolored IC shapes (i.e., IC shapes that have not been assigned a color). The different colored IC shapes are associated with different masks used in a multiple patterning lithography process. For example, IC shapes assigned a first color (e.g., black) are associated with a first mask, while IC shapes assigned a second color (e.g., gray) are associated with a second mask.

At step 308, a multiple mask set is formed in a manner that writes pre-colored data to a same mask. In some embodiments, the multiple mask set is formed by writing pre-colored IC shapes to a particular mask, while IC shapes that are not pre-colored are written to masks based upon their assigned colors. For example, in a double patterning lithography process a first mask is generated to form non-pre-colored IC shapes that have been assigned a first color and a second mask is generated to form both non-pre-colored IC shapes that have been assigned a second color and pre-colored IC shapes. In other words, when forming masks, the pre-colored data is written to a mask independent of the decomposition algorithm, while non-pre-colored data is written to a mask based upon a color assigned to the data during the decomposition algorithm.

At step 310, a multiple patterning lithography is performed using the multiple mask set. In some embodiments the multiple patterning lithography process comprises a double pattern, double etch (2P2E) process.

Although method 300 illustrates embodiments wherein pre-coloring (step 306) is performed after decomposition (step 304), one or ordinary skill in the art will appreciate that in other embodiments pre-coloring (step 306) may also be performed prior to decomposition (step 304).

Figure 4:
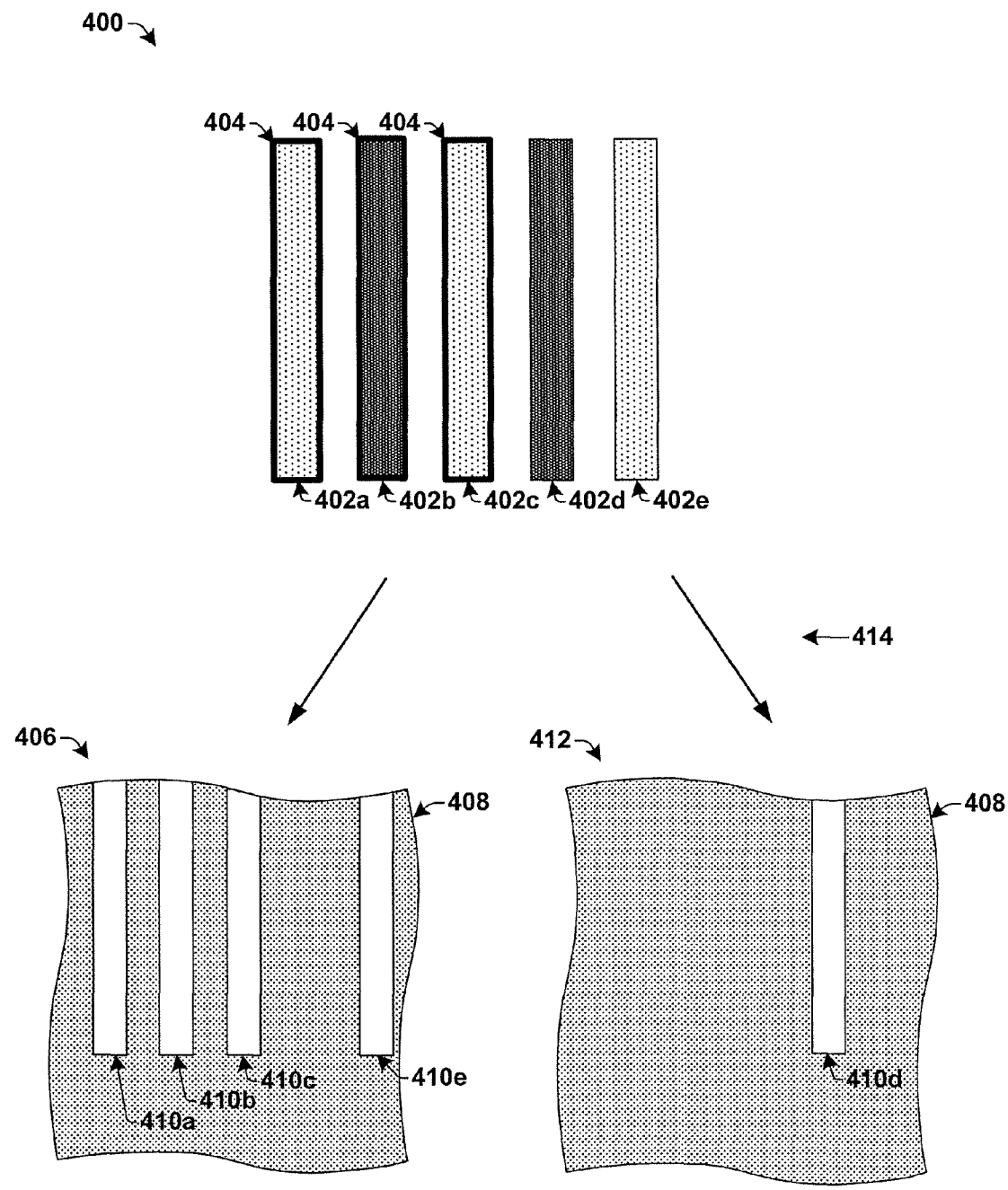
FIG. 4 is a block diagram illustrating some embodiments of an exemplary decomposition of an integrated chip layout with pre-colored data to form a two mask set for a double patterning lithography process.

Some embodiments of an exemplary integrated chip layout 400, whereon such a method 300 is implemented, is illustrated in FIG. 4. It will be appreciated that although FIG. 4 is described in relation to the formation of metal wire segments (i.e., metal interconnect lines), the disclosed method of pre-coloring data is not limited to such layers. Rather, the disclosed method of pre-coloring may be applied in any layers and/or areas of an integrated chip layout that utilize a multiple patterning lithography process.

Integrated chip layout 400 comprises a plurality of metal wire segments 402a-402e that have been assigned a color (e.g., during a decomposition of the IC layout 400), which indicates a mask with which a metal wire segment is associated for a double patterning lithography process. For example, metal wire segments 402a, 402c and 402e have been assigned a first color, while metal wire segments 402*b* and 402*d* have been assigned a second color. Furthermore, a pre-colored marker shape 404 has been placed onto metal wire segments 402*a*, 402*b*, and 402*c*.

During mask formation 414 (e.g., corresponding to step 308) a two mask set is formed to enable a double patterning lithography process. The two mask set comprises a first mask 406 and a second mask 412. The first mask 406 comprises data that has been pre-colored, as well as data that was assigned the first color during decomposition. For example, pre-colored metal wire segment 402*a*, 402*b*, and 402*c* are written onto the first mask 406 as openings 410*a*, 410*b* and 410*c* within opaque surface 408 (e.g., a chrome surface) due to pre-coloring with marker shape 404. Furthermore, metal wire segment 402*e* is written onto the first mask 406 as opening 410*e* within opaque surface 408 due to it being assigned the first color.

The second mask 412 comprises data that has not been pre-colored and data that was assigned the second color during decomposition. For example, metal wire segment 402*d* is written onto the second mask 412 due to it being assigned the second color. However, metal wire segment 402*b*, despite being assigned the second color, is not written onto the second mask 412 since it was pre-colored with marker shape 404.

It will be appreciated that the illustrated first and second masks are non-limiting examples intended to aid the reader's understanding. Although the first and second masks, 406 and 412, are illustrated as chrome masks with simple geometric openings corresponding to the location of metal wire segments (e.g., 410*a*, 410*b*, . . . ), one or ordinary skill in the art will appreciate that actual masks may not resemble the metal wire segments but instead may contain printing enhancement features added during optical proximity correction. Furthermore, it will be appreciated that the disclosed method of pre-coloring may be applied to a multiple-patterning lithography scheme using more than two masks. For example, a triple patterning lithography scheme would decompose an integrated chip layout into a three mask set, a quadruple patterning lithography scheme would decompose an integrated chip layout into a four mask set, etc.

Although the disclosed method of pre-coloring may be applied in any area of an integrated chip it has been appreciated that use of the disclosed method of pre-coloring may be advantageous in parts of an SRAM design that rely upon a high degree of symmetry for proper operation. This is because SRAM circuits are typically made at sub-design rule dimensions that increase the impact of processing variations. Therefore, in some embodiments, pre-coloring may be applied to selective parts of an SRAM circuit within an integrated chip layout, without applying pre-coloring to other sections of the IC layout, such as for example logic elements.

Figure 5:
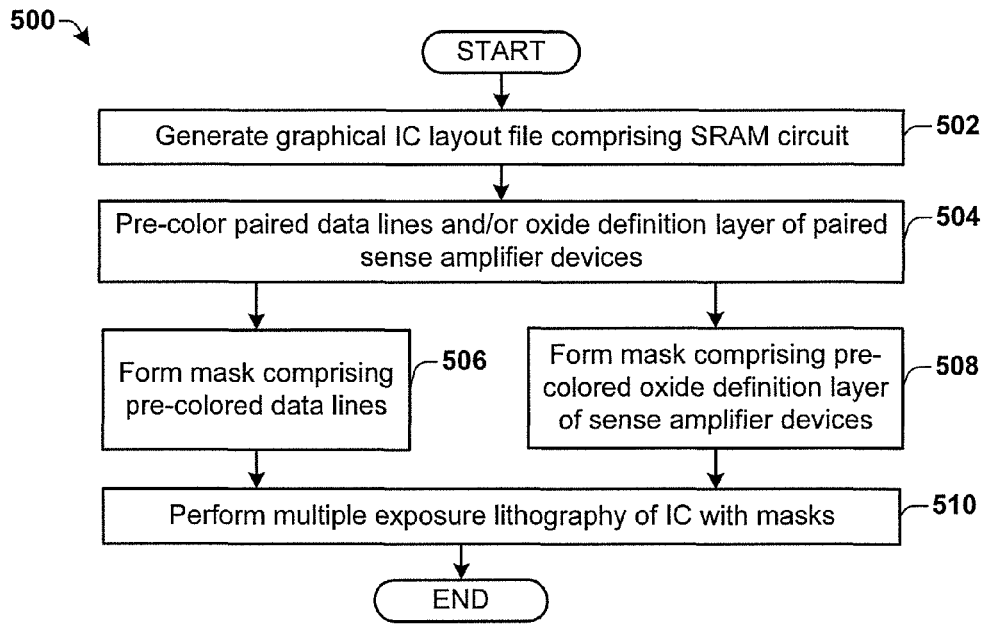
FIG. 5 is a flow diagram illustrating some embodiments of a method of pre-coloring paired data lines and/or sense amplifier paired devices within an SRAM circuit.

FIG. 5 illustrates a flow diagram illustrating a method 500 of pre-coloring paired data lines and/or sense amplifier devices within an SRAM circuit of an integrated chip layout, in accordance with some embodiments.

It will be appreciated that while the methods disclosed herein (e.g., methods 200 and 500) are illustrated and described as a series of acts or events, that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 10:
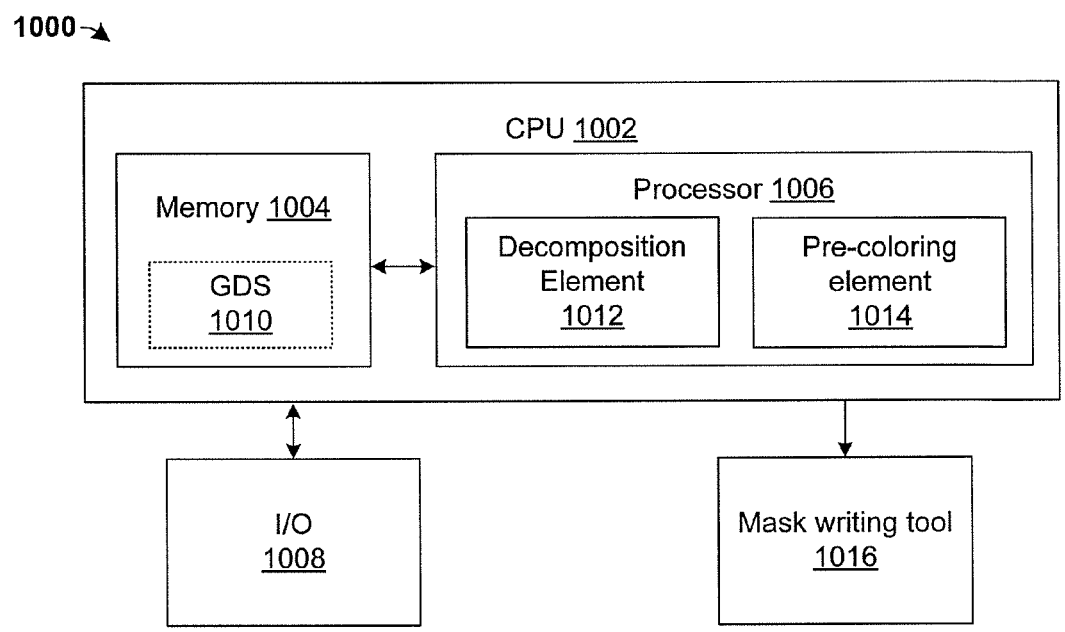
FIG. 10 illustrates some embodiments of exemplary computing environment wherein one or more of the provisions set forth herein may be implemented.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuit shown in FIG. 10, are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At step 502, a graphical IC layout file comprising an SRAM circuit is formed. The graphical IC layout file is a graphical representation of an integrated chip having an SRAM array and periphery circuits. The SRAM circuit comprises paired data lines and a sense amplifier with paired devices. In some embodiments, the data lines may be flanked by shielding wires (e.g., grounded wires) configured to shield signals transmitted by the data lines from external influences.

At step 504, paired data lines and/or paired sense amplifier devices of the SRAM circuit are pre-colored. Pre-coloring the paired data lines and/or paired sense amplifier devices causes them to be written to a same mask, thereby reducing processing variations (e.g., mask misalignment, CD variation). In some embodiments, pre-coloring the data lines comprises pre-coloring the data lines as well as shielding wires surrounding the data lines. In some embodiments, pre-coloring the sense amplifier devices comprises pre-coloring oxide definition layers (i.e., diffusion regions) of paired devices within a sense amplifier. In some embodiments, multiple types of pre-coloring marker shapes may be used during the pre-coloring. For example, the paired data lines may be assigned to a first mask by way of a first pre-coloring marker shape, while paired devices of a sense amplifier may be assigned to a second mask by way of a second pre-coloring marker shape.

At step 506, a multiple mask set is formed in a manner that forms pre-colored data lines on a same mask. By forming pre-colored data lines and/or shielding wires on a same mask, processing variations are reduced. For example, by forming paired data lines on a same mask overlay errors are reduced between the paired data lines, thereby reducing variation in the distance between a paired data lines. By further forming paired data lines and shielding wires on a same mask, overlay errors are reduced between the paired data lines and the adjacent shielding wires. By reducing overlay errors, capacitive coupling with the paired data lines is reduced (e.g., since coupling capacitance of a data line with an adjacent shielding line is equal to C=□·A/d), thereby avoiding an RC delay within signals read from an SRAM cell.

At step 508, a multiple mask set is formed in a manner that forms one or more components of the pre-colored sense amplifier on a same mask. In some embodiments, the paired sense amplifier devices comprise a differential pair of devices configured to receive an input signal from a SRAM array by way of complimentary data lines. Any mismatch between such devices is manifest as offset voltage at the sense amplifier's input. By forming components of such devices on a same mask, processing variations (e.g., overlay errors, CD tolerances) are reduced between the devices, thereby reducing device mismatch between the devices and improving performance of the sense amplifier.

At step 510, a multiple exposure lithography of an integrated chip is performed using a multiple mask set formed in step 506 and/or 508. In some embodiments, the multiple mask set comprises a same mask that has the pre-colored paired data lines and/or the pre-colored sense amplifier paired devices.

FIGS. 6-9 illustrate some embodiments of an exemplary application of the disclosed method 500 of pre-coloring paired data lines and/or sense amplifier devices within an SRAM circuit.

Figure 6:
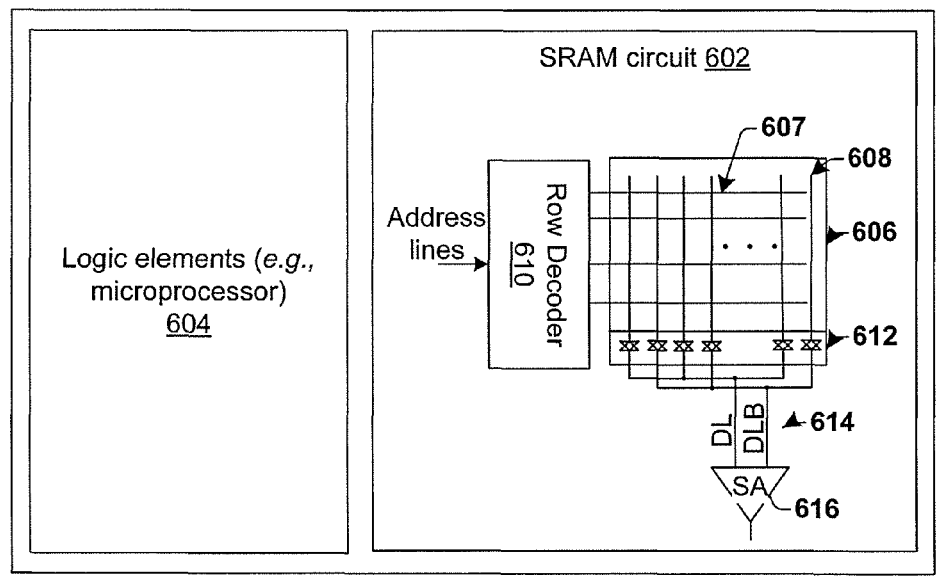
FIG. 6 illustrates a block diagram of some embodiments of a SRAM circuit comprising an SRAM array and its peripheral circuits.

FIG. 6 illustrates a block diagram of an integrated chip 600 comprised within a graphical IC layout. The integrated chip comprises an SRAM circuit 602 and one or more logic elements 604 (e.g., a microprocessor). The SRAM circuit 602 comprises an SRAM array 606 having a plurality of SRAM cells (not shown) configured to store data. The SRAM cells are connected to periphery circuits (e.g., column decoder 610, plurality of multiplexors 612, and sense amplifier 616) by way of a plurality of word lines 607 and bit lines 608, configured to control access to the SRAM cells.

During operation, a row decoder 610 is configured to select one of the word lines, while the plurality of multiplexors 612 are configured to select a bit line and a bit line bar. The word line and bit line combination defines a cell address, which upon being accessed provides charge on two complimentary data lines 614, data line (DL) and data line bar (DLB). The complimentary data lines 614 provide the charge to sense amplifier 616, which comprises cross coupled inverters typically having one or more sets of paired transistor devices. The sense amplifier 616 is configured to convert the voltage differential between data lines DL and DLB to full voltage differential corresponding to data stored in the accessed SRAM cell.

Figure 7A:
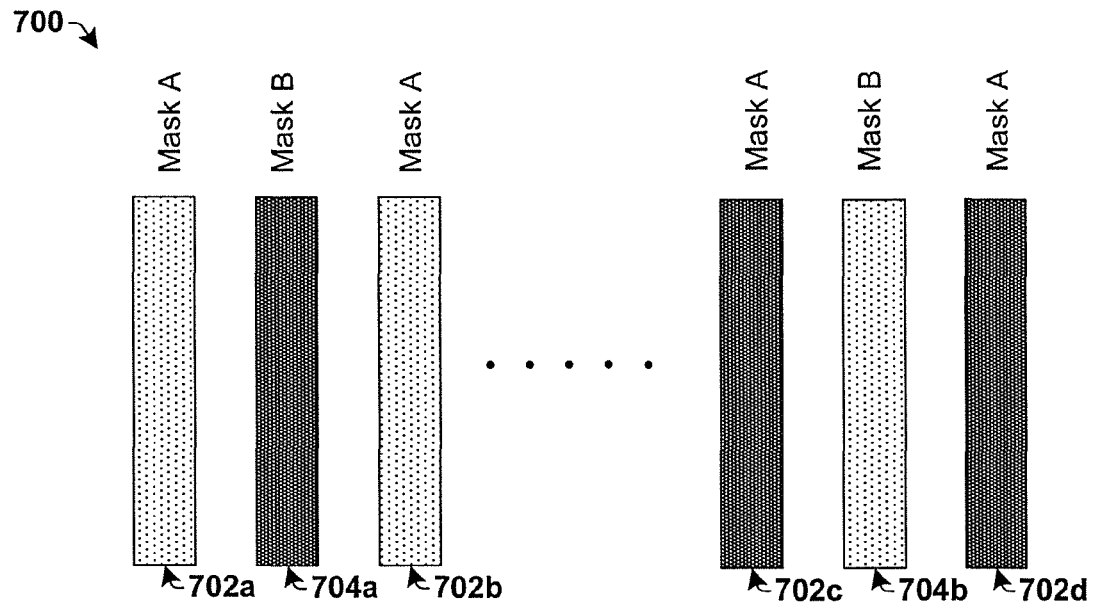
FIGS. 7A-7B are block diagrams of some embodiments of differential paired data lines connecting an SRAM array to a sense amplifier, before and after pre-coloring.

FIG. 7A illustrates a block diagram 700 of some embodiments of a differential pair of data lines 704a, 704b that have not been pre-colored. The differential pair of data lines 704a, 704b connect an SRAM array to a sense amplifier and are configured to relay complimentary signals from an SRAM cell within the SRAM array to the sense amplifier. In some embodiments, the data lines 704 are flanked by shielding wires 702 configured to shield signals conveyed by the data lines 704 from external influences. For example, as shown in IC layout 700, data line 704a is flanked by shielding wires 702a and 702b, while complimentary data line 702b is flanked by shielding wires 702c and 702d.

Since adjacent wires are separated by a minimum spacing, during decomposition the data lines 704a and shielding wires 702c and 702d have been assigned a first color, while data line 704b and shielding wires 702a and 702b have been assigned a different, second color. The first color denotes that data line 704a and shielding wires 702c and 702d are to be written to a first mask (Mask A). The second color denotes that data line 704b and shielding lines 702a and 702b are to be written to a second mask (Mask B). Since data line 704a and adjacent shielding wires 702a, 702b are written to different masks, a mask misalignment is present between the data line 704a and shielding lines 702a, 702b. The mask misalignment causing a variation in capacitive coupling.

Figure 7B:
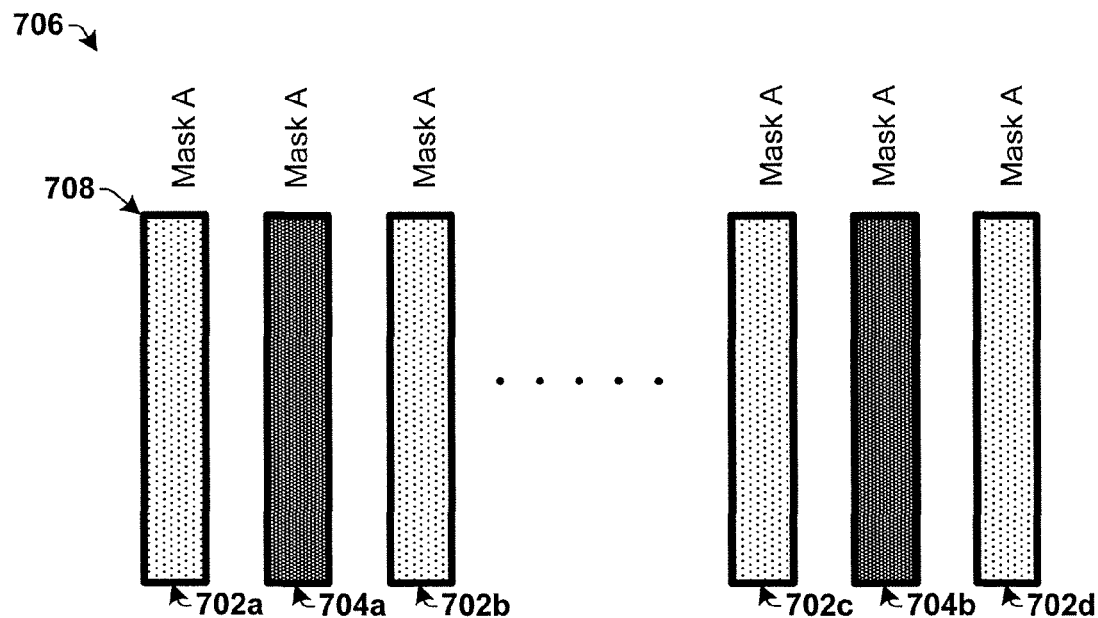

FIG. 7B illustrates a block diagram 706 of some embodiments of a differential pair of data lines 704a, 704b that have been pre-colored. The differential pair of data lines 704a, 704b connect an SRAM array to a sense amplifier. In addition to the coloring assigned during decomposition, the data lines 704 and shielding wires 702 have also been pre-colored according to a marker shape 708. By pre-coloring the shielding wires 702 and the data lines 704, the data lines 704 and shielding wires 702 will be written onto a same mask (Mask A) during mask formation, in spite of the colors that have been or will be assigned by decomposition. By writing data lines 704 and shielding wires 702 onto a same mask (Mask A), overlay errors between the structures due to mask misalignment are eliminated, thereby improving overlay and reducing variations in capacitive coupling.

Figure 8A:
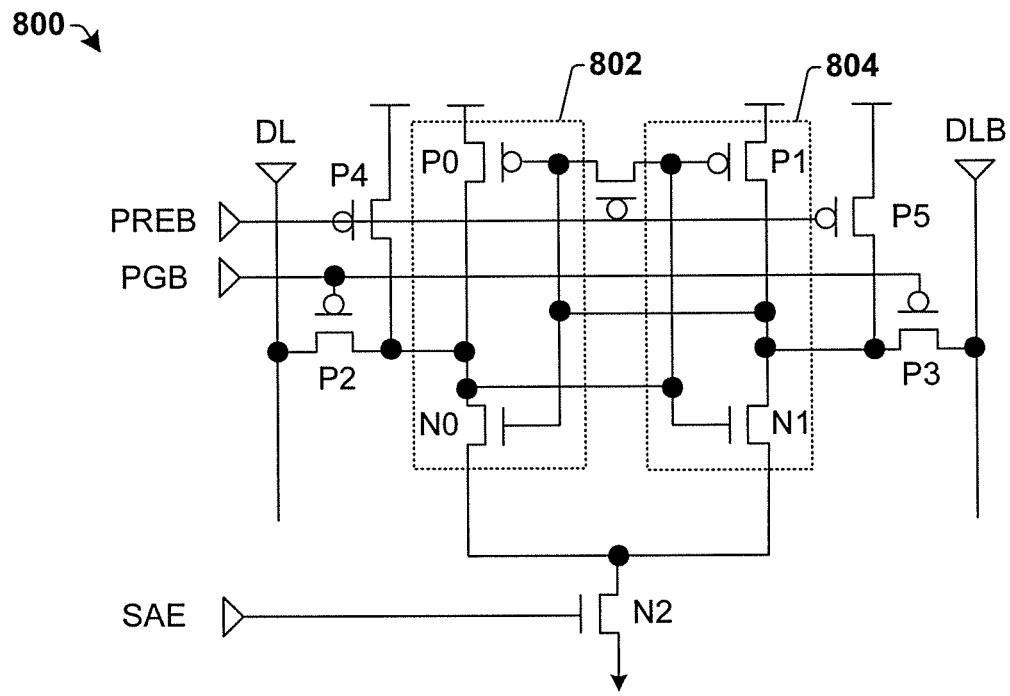
FIG. 8A is a schematic diagram of some embodiments of an SRAM sense amplifier.

FIG. 8A illustrates a circuit diagram of an exemplary sense amplifier 800. The sense amplifier 800 utilizes differential sensing for read operations, due to the small output signals from an SRAM cell. The sense amplifier 800 comprises a pair of cross coupled inverters 802 and 804, comprising pull-up transistors, P0 and P1, respectively connected in series with pull-down transistors, N0 and N1. In some embodiments, the sense amplifier 800 may be pre-charged based on a pre-charge signal PREB.

Pull-down transistors N0 and N1 are coupled to differential data lines, DL and DLB, by way of pass gate transistors, P2 and P3. The pass gate transistors P2, P3 are controlled by a pass-gate bar (PGB) signal that controls whether the signals from data lines DL and DLB should be input into sense amplifier SA. The differential data lines DL and DLB are configured to convey complimentary signals corresponding to data stored in the SRAM cell. Based upon the content of the complimentary signals, the cross coupled inverters 802 and 804 will latch to a state that is provided as an output of the sense amplifier 800. Once the sense amplifier 800 receives an effective sense amplifier enable (SAE) signal from the controller, it will output a read data of a memory cell.

Figure 8B:
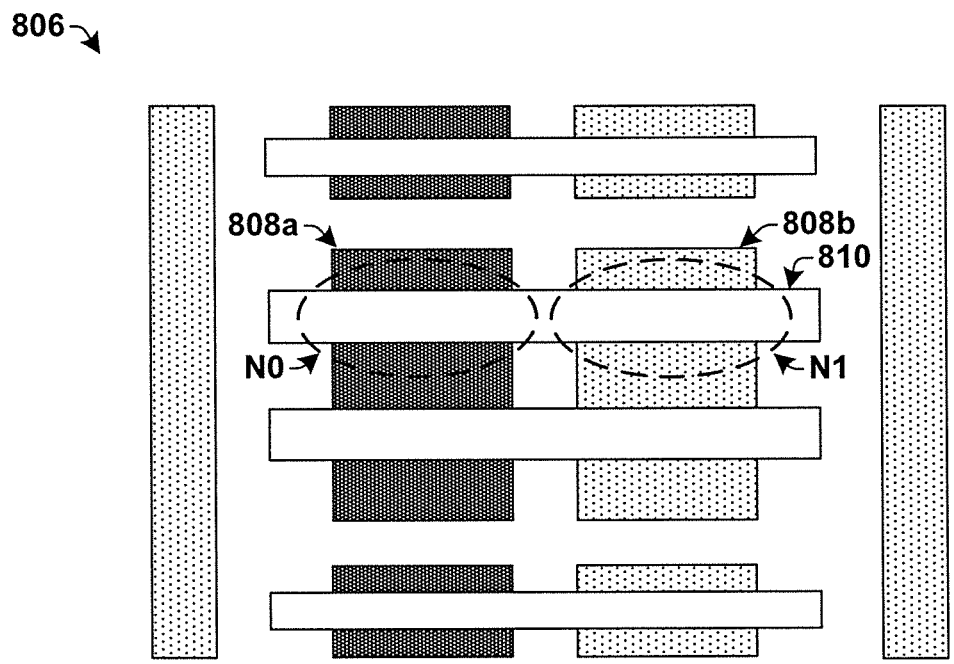
FIGS. 8B-8C are block diagrams of some embodiments of an SRAM sense amplifier before and after pre-coloring.

FIG. 8B illustrates a sense amplifier layout 806 corresponding to sense amplifier 800. The sense amplifier layout 806 comprises devices N0 and N1. The devices N0 and N1 comprise an oxide definition layer 804 (e.g., a diffusion/active region) overlaid with a gate layer 810 (e.g., a polysilicon layer). During decomposition oxide definition layer 808a has been assigned a first color, while oxide definition layer 808b has been assigned a different, second color. The different colors dictate that oxide definition layer 808a is to be written to a first mask, and oxide definition layer 808b is to be written to a second mask.

However, writing the oxide definition layers 808a and 808b to different masks may introduce an overlay error and/or CD variation into the oxide definition layers. Since proper operation of the sense amplifier relies upon a high degree of symmetry, such overlay error and/or CD variation may introduce a device mismatch (e.g., different performance between the devices) that causes circuit functionality issues.

Figure 8C:
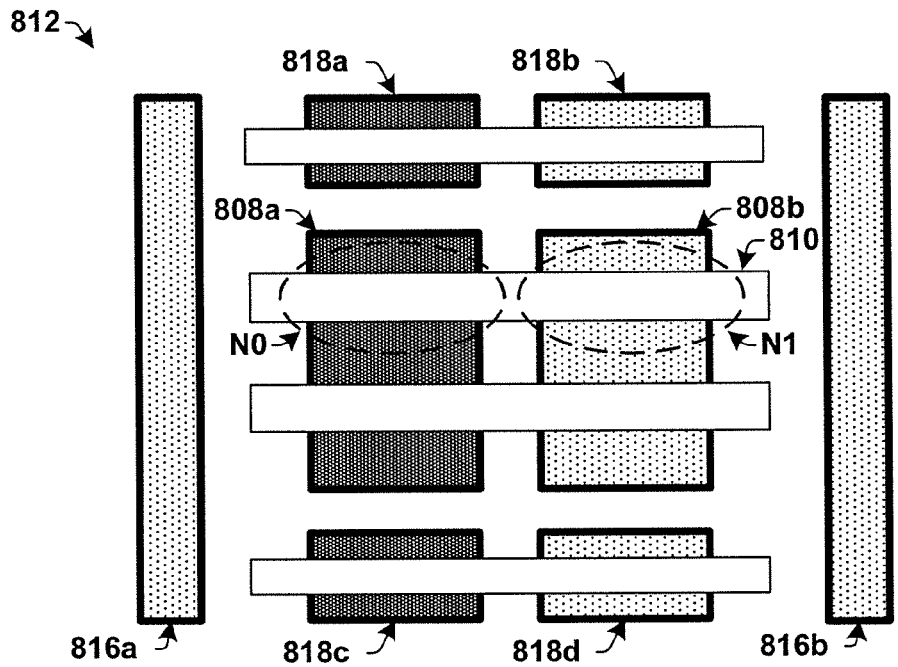

FIG. 8C illustrates a pre-colored sense amplifier layout 812 corresponding to sense amplifier 800. In addition to the coloring assigned during decomposition, the oxide definition layers 808a and 808b have also been pre-colored according to a marker shape 814. By pre-coloring the oxide definition layers 808a and 808b, they will be written onto a same mask during mask formation, in spite of the colors that have been or will be assigned. By writing oxide definition layers 808a and 804b onto a same mask overlay error and CD tolerance are improved.

In some embodiments, oxide definition layers 816a and 816b and/or 818a-818d surrounding the oxide definition layers 808a and 808b may also be pre-colored so that the structures are written onto the same mask as the oxide definition layers 808a and 808b. By pre-coloring oxide definition layers 816a and 816b and/or 818a-818d processing variations between the structures are reduced improving device performance.

Figure 9:
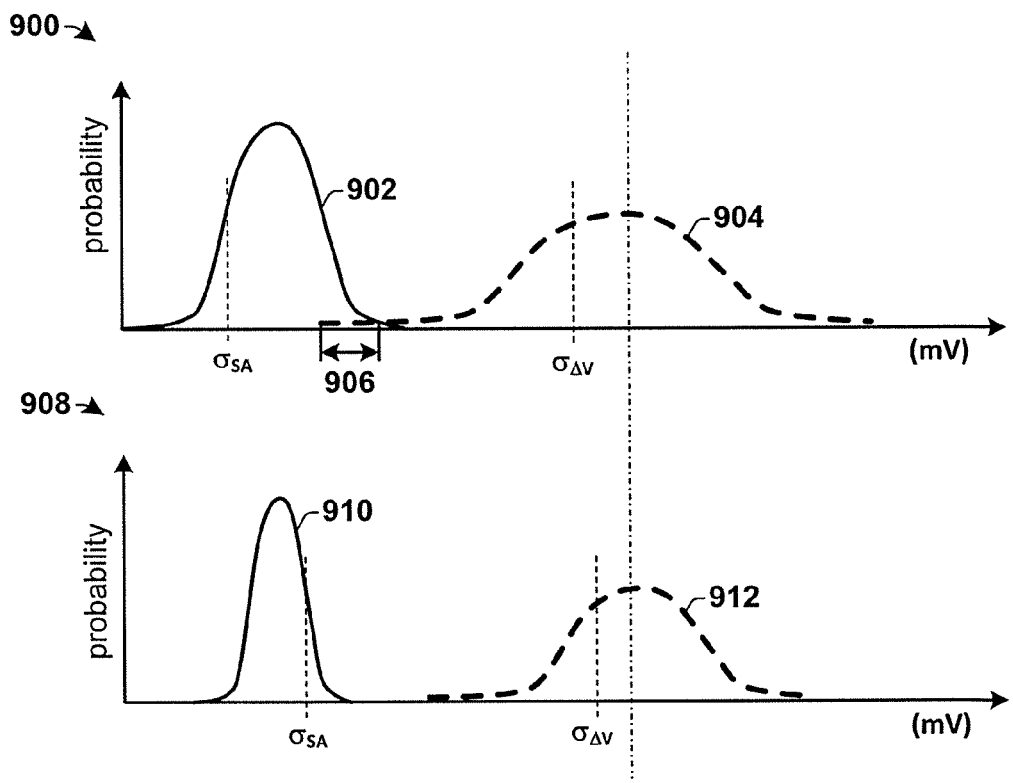
FIG. 9 illustrates graphs showing simulated distribution of a sense amplifier offset voltage and voltage differential for an SRAM cells with and without pre-colored data lines and sense amplifier devices.

FIG. 9 illustrates graphs showing simulated statistical distributions of the sense amplifier offset voltage for a SRAM array formed without using the disclosed method of pre-coloring (graph 900) and for an SRAM array formed using the disclosed method of pre-coloring (graph 908).

Graph 900 illustrates a statistical distribution of a sense amplifier offset voltage 902 (i.e., the probability of achieving a particular sense amplifier offset voltage) and the statistical distribution of the differential voltage of data lines 904 (i.e., the probability of achieving a particular differential voltage, $V_{DL}-V_{DLB}$) for an SRAM array formed using a double patterning exposure without the disclosed method of pre-coloring. As shown in graph 900, the probabilities have Gaussian distributions. In region 906 the statistical distribution of the differential voltage of data lines 904 overlaps the statistical distribution of the sense amplifier offset voltage 902, meaning that the differential voltage of the data lines is less than the offset voltage. Since the differential voltage of the data lines is less than the offset voltage, the senses amplifier is unable to accurately determine a value of the differential voltage, leading to SRAM read failure.

Graph 908 illustrates a statistical distribution of a sense amplifier offset voltage 910 and the statistical distribution of the differential voltage of data lines 912 (i.e., $V_{DL}-V_{DLB}$) for an SRAM array formed using a double patterning exposure with the disclosed method of pre-coloring. The disclosed method of pre-coloring narrows the distribution of data-line differential voltage and sense offset voltage (i.e., it reduces the probability of having a large sense amplifier offset voltage and/or differential voltage of data lines), such that the statistical distribution of the sense amplifier offset voltage 910 and the statistical distribution of the differential voltage of data lines 912 do not overlap (i.e., the differential voltage of data lines 912 is not smaller than the sense amplifier offset voltage 910). Since there is no overlap of the distributions, the differential voltage of the data lines is greater than the offset voltage and the sense amplifier is able to accurately determine a value of the differential voltage so that SRAM read failures are avoided.

FIG. 10 illustrates an example of a system 1000 comprising a computing device 1002 (e.g., server) configured to implement one or more embodiments provided herein. In one configuration, computing device 1002 includes at least one processing unit 1006 and a memory 1004. Components of computing device 1002 may be connected by various bus interconnects, such as a Peripheral Component Interconnect (PCI), a Universal Serial Bus (USB), firewire (IEEE 13104), an optical bus structure, etc.

Memory 1004 is configured to contain a graphical IC layout file 1010 (e.g., a GDS file) containing data corresponding to an IC layout. The processing unit 1006 is configured to read the graphical IC layout file 1010 from memory 1004. The processing unit 1006 comprises a decomposition element 1012 configured to perform decomposition on the graphical IC layout file 1010 and a pre-coloring element 1014 configured to pre-color data within the graphical IC layout file 1010.

In some embodiments, the decomposition element 1012 and/or the pre-coloring element 1014 may comprise software programs executed by the processing unit 1006. In one embodiment, computer readable instructions to implement the decomposition and/or pre-coloring may be stored in a memory (e.g., memory 1004). In such embodiments, processing unit 1006 may download a part or all of the computer readable instructions for execution during operation. In other embodiments, the decomposition element 1012 and/or pre-coloring element 1014 may comprise hardware components configured to performed a decomposition and/or pre-coloring of data within the graphical IC layout file 1010.

In some embodiments, the pre-coloring element 1014 may be operated by way of I/O 1008 (e.g., a keyboard, mouse, etc.) to add one or more pre-coloring marker shapes to the graphical IC layout file 1010. An output port of the computing device 1002 is configured to output the data after pre-coloring and decomposition have been completed. The output data is provided to a mask writing element 1016. In some embodiments, the mask writing element 1016 may comprise an e-beam lithography tool or a laser mask writing tool, for example. The mask writing element 1016 is configured to form one or more masks based upon the decomposed and pre-colored data output from the processing unit 1006.

Although the disclosure has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several aspects of the disclosure, such feature may be combined with one or more other features of the other aspects as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Therefore, the present disclosure relates to method of pre-coloring data within an IC layout to reduce processing variations caused by a multiple patterning lithography process.

In some embodiments, the present disclosure relates to a method for pre-coloring IC layout data for a multiple patterning lithography process, comprising generating a graphical IC layout file comprising a plurality of IC shapes within SRAM data lines or oxide definition layers of an SRAM sense amplifier. The method further comprises pre-coloring selective IC shapes to indicate that the pre-colored IC shapes are to be formed on a same mask. The method further comprises operating a decomposition algorithm that assigns two or more different colors to uncolored IC shapes while the pre-colored IC shapes keep their pre-colored colors, such that IC shapes assigned a same color are to be formed on a same mask of a multiple mask set used for the multiple patterning lithography. By forming the pre-colored IC shapes on the same mask processing variations between on-chip structures corresponding to the pre-colored IC shapes are reduced.

In another embodiment, the present disclosure relates to a method for pre-coloring data within an integrated chip (IC) layout. The method comprises generating a graphical integrated chip (IC) layout comprising an SRAM memory circuit having first and second data lines configured to convey complimentary signals from an SRAM memory cell to a sense amplifier, a first device coupled to the first data line, wherein the first device comprises a first oxide definition region, and a second device coupled to the second data line, wherein the second device comprises a second oxide definition region. The method further comprises pre-coloring the first and second data lines or the first and second oxide definition regions to indicate that the first and second data lines or the first and second oxide definition regions are to be formed on a same mask of a multiple mask set, used for the multiple patterning lithography process. The method further comprises forming the multiple mask set so that at least one mask of the multiple mask set comprises features corresponding to the pre-colored first and second data lines or the pre-colored first and second oxide definition regions.

In another embodiment, the present disclosure relates to a computer system, comprising a memory element configured to store a graphical IC layout comprising an SRAM memory circuit. The system further comprises a decomposition element configured to operate a decomposition algorithm on the graphical IC layout that assigns two or more colors to uncolored IC shapes within the SRAM memory circuit. The system further comprises a pre-coloring element configured to pre-color one or more of the plurality of IC shapes to indicate that the one or more of the plurality of IC shapes are to be formed on a same mask of a multiple mask set used for the multiple patterning lithography process.

What is claimed is:

1. A method for pre-coloring IC layout data for a multiple patterning lithography process, comprising:
   generating a graphical IC layout file using a computing device, wherein the graphical IC layout file comprises a plurality of IC shapes within SRAM data lines or oxide definition layers of an SRAM sense amplifier;
   pre-coloring selective IC shapes to have a same color that indicates that the pre-colored IC shapes are to be formed on a same mask, using the computing device;
   operating a decomposition algorithm using the computing device, wherein the decomposition algorithm assigns two or more different colors to uncolored IC shapes while the pre-colored IC shapes keep their pre-colored colors; and
   forming a multi-mask set for the multiple patterning lithography process, using the computing device, in a manner such that IC shapes assigned the same color are formed on a same mask and IC shapes assigned different colors are formed on different masks;
   wherein forming the pre-colored IC shapes on the same mask reduces processing variations between on-chip structures corresponding to the pre-colored IC shapes.

2. The method of claim 1, further comprising:
   forming the multiple mask set so that respective masks of the multiple mask set comprise features corresponding to non pre-colored IC shapes having a particular color, and at least one mask of the multiple mask set additionally comprises features corresponding to the pre-colored IC shapes.

3. The method of claim 1, wherein pre-coloring one or more of the IC shapes comprises placing a pre-coloring marker shape on the one or more of the plurality of IC shapes, which indicates that the one or more of the plurality of IC shapes are to be formed on the same mask.

4. The method of claim 1, wherein pre-coloring one or more of the IC shapes comprises assigning a pre-coloring color, not used in the decomposition, to the one or more of the plurality of IC shapes, such that a total number of colors assigned to the plurality of IC shapes is greater than a number of masks in the multiple mask set.

5. The method of claim 1, wherein the plurality of IC shapes comprise:
   a data line and a complimentary data line that extend from an SRAM memory array to a sense amplifier and that are configured to convey complimentary data signals from an SRAM cells within the SRAM memory array to the sense amplifier.

6. The method of claim 5, wherein the plurality of IC shapes further comprise:
   shielding wires positioned to flank each of the paired data lines,
   wherein pre-coloring the shielding wires reduces the processing variations between on-chip structures corresponding to the paired data lines and shielding wires.

7. The method of claim 1, wherein the plurality of IC shapes comprise:
   an oxide definition region of a first device coupled to a data line;
   an oxide definition region of a second device coupled to a complimentary data line;
   wherein pre-coloring the first and second oxide definition regions reduces processing variations between on-chip structures corresponding to the first and second oxide definition regions.

8. The method of claim 7, wherein the plurality of IC shapes further comprise:
   one or more additional oxide definition regions surrounding the first and second oxide definition regions;
   wherein pre-coloring the one or more additional oxide definition regions reduces the processing variations between on-chip structures corresponding to the first and second oxide definition regions and the one or more additional oxide definition regions.

9. A method for pre-coloring data within an integrated chip (IC) layout, comprising
   generating a graphical integrated chip (IC) layout comprising an SRAM memory circuit, using a computing device, wherein the graphical IC layout has design shapes comprising:
      first and second data lines configured to convey complimentary signals from an SRAM cell to a sense amplifier;
      a first device coupled to the first data line, wherein the first device comprises a first oxide definition region;
      a second device coupled to the second data line, wherein the second device comprises a second oxide definition region;
   pre-coloring the first and second data lines or the first and second oxide definition regions, using the computing device, to have a same color that indicates that the first and second data lines or the first and second oxide definition regions are to be formed on a same mask of a multiple mask set used for the multiple patterning lithography process; and
   forming the multiple mask set, using the computing device, such that design shapes assigned the same color are formed on a same mask and design shapes assigned different colors are formed on different masks, so that one mask of the multiple mask set comprises features corresponding to the pre-colored first and second data lines or the pre-colored first and second oxide definition regions.

10. The method of claim 9, wherein pre-coloring the first and second data lines or the first and second oxide definition regions comprises placing a pre-coloring marker shape on the first and second data lines or the first and second oxide definition regions, which indicates that the first and second data lines or the first and second oxide definition regions are to be formed on the same mask.

11. The method of claim 10, wherein the first and second data lines are assigned to a first mask by way of a first pre-coloring marker shape and the first and second oxide definition layers are assigned to a second mask by way of a second pre-coloring marker shape.

12. The method of claim 9, wherein pre-coloring the first and second data lines or the first and second oxide definition regions is performed after operating the decomposition algorithm.

13. The method of claim 9, wherein pre-coloring the first and second data lines or the first and second oxide definition regions is performed prior operating the decomposition algorithm.

14. The method of claim 9,
wherein the SRAM memory circuit further comprises a plurality of shielding wires positioned to flank each of the first and second data lines;
wherein the shielding wires are pre-colored so as to reduce processing variations between on-chip structures corresponding to the first and second oxide definition regions.

15. The method of claim 9,
wherein the sense amplifier further comprises one or more additional oxide definition regions surrounding the first and second oxide definition regions;
wherein the one or more additional oxide definition regions are pre-colored so as to the processing variations between on-chip structures corresponding to the first and second oxide definition regions and the one or more additional oxide definition regions.

16. A computer system, comprising
a memory element configured to store a graphical IC layout comprising an SRAM memory circuit;
a decomposition element configured to operate a decomposition algorithm on the graphical IC layout that assigns two or more colors to uncolored IC shapes within the SRAM memory circuit;
a pre-coloring element configured to pre-color one or more of the plurality of IC shapes to have a same color that indicates that the one or more of the plurality of IC shapes are to be formed on a same mask of a multiple mask set used for the multiple patterning lithography process; and
a mask writing tool configured to form a multi-mask set in a manner such that IC shapes assigned the same color are formed on a same mask and IC shapes assigned different colors are formed on different masks.

17. The computer system of claim 16, wherein pre-coloring the one or more the plurality of IC shapes comprises placing a pre-coloring marker shape on the IC shapes that indicates that the one or more the plurality of IC shapes are to be formed on the same mask.

18. The computer system of claim 16, wherein the plurality of IC shapes, comprise:
a data line and a complimentary data line that extend from an SRAM memory array to a sense amplifier and that are configured to convey complimentary data signals from an SRAM cells within the SRAM memory array to the sense amplifier.

19. The computer system of claim 18, wherein the plurality of IC shapes comprise:
shielding wires positioned to flank each of the data lines,
wherein pre-coloring the shielding wires reduces the processing variations between on-chip structures corresponding to the data lines and shielding wires.

20. The computer system of claim 16, wherein the plurality of IC shapes comprise:
an oxide definition region of a first device coupled to a data line;
an oxide definition region of a second device coupled to a complimentary data line;
wherein pre-coloring the first and second oxide definition regions reduces processing variations between on-chip structures corresponding to the first and second oxide definition regions.

\* \* \* \* \*